UNITED STATES PATENT OFFICE.

WILLIAM MORISON, OF MONTCLAIR, NEW JERSEY.

COMPOSITION OF MATTER FOR MANUFACTURING BATTERY-CASES, &c.

SPECIFICATION forming part of Letters Patent No. 580,139, dated April 6, 1897.

Application filed November 24, 1896. Serial No. 613,319. (No specimens.)

*To all whom it may concern:*

Be it known that I, WILLIAM MORISON, a subject of the Queen of Great Britain, and a resident of Montclair, in the county of Essex and State of New Jersey, have invented a certain new and useful Composition of Matter for the Manufacture of Battery-Cases, &c., of which the following is a specification.

The object of my invention is to provide a new non-conducting acid-proof and acid-tight composition for battery-cases, &c.; and to that end my invention consists in treating certain materials under heat, as hereinafter set forth, and in then subjecting the same to a kneading or pounding treatment preparatory to forming the article desired by subjecting the same to pressure in molds.

To carry my invention into effect and to make my cases or boxes, which I utilize for batteries for bicycle and miners' lamps, and which invention may be adapted for insulating articles or similar or other suitable work of every description, I make a charge suitable for the purpose, as follows: I put in a pan say fourteen ounces of Cuban, Egyptian, Trinidad, or other asphaltum, or say eight to ten ounces of asphaltum and five to six ounces of pitch, such as glance or Venezuelan or other pitch of similar grade, which I make in this way, reference being had to the making of sixteen to eighteen ounces of the composition. I put the material in a pan or other receptacle and place the same over a gas-jet or other caloric until I melt the material so that it appears like molasses. I now ordinarily add thereto a very small quantity of gutta-percha and subject the same to a lower degree of heat. By boiling my composition I drive away foreign matter, which escapes in the form of smoke and gas, and I thereby make the material more dense. The gutta-percha makes the same more elastic and tenacious. After the parts are thoroughly mixed I put in gradually asbestos, ordinarily intimately mixing in as much fiber asbestos as the compound will absorb, and gradually heat and work the same until it gets somewhat stiffer than putty. I then spread the material out in the same hot pan (or on a separate hot plate, if made in large quantities) and thoroughly work, beat, and pound the same to drive out moisture and foreign substances and ordinarily add a small quantity of sulfur, (as a tablespoonful spread over it.) This is worked in with care, so as not to burn the material. The addition of the sulfur makes the composition spongy and gives tenacity to the mass. This is worked until the swelling ceases, say for five or ten minutes. It is then pounded (as with a large hammer or paver's ram) until not any of the whole mass will stick to iron, this operation serving to drive out all the foreign matter. When the gas is all out of the composition and the material is well mixed together, the compound is ready. The above operations are all done under a moderate degree of heat, (say not less than 150° Fahrenheit.)

After being prepared the composition is put into a mold hot, and it can immediately (say in twenty to forty seconds) be taken out, and the resultant box comes out hard and smooth and has a polished surface and does not require seasoning or any further treatment.

Certain kinds of asphaltum and pitch can be worked with asbestos and sulfur without the aid of the gutta-percha, and consequently that part of the process, together with that relating to sulfur, can in some cases be eliminated without in any way affecting the article as an acid-proof electrical non-conducting material.

It is evident that many changes in the operations described might be resorted to without departing from the spirit and scope of my invention. I would have it understood that I do not restrict myself to the particular operations as described, but that I reserve the right to make such changes, and that

What I claim is—

1. The process of making a composition which consists in first melting asphaltum or the like, second, adding thereto, while hot, asbestos, and intimately mixing the two thoroughly together; third, spreading out the mass as mixed, on a hot surface, and thoroughly working, beating and pounding the same to drive out moisture and foreign substances; fourth, dusting sulfur thereon and again thoroughly beating, pounding and working the mass—the mass to be hot throughout the carrying out of the process; and fifth, forming the article desired of the mass, substantially as set forth.

2. The herein-described composition of matter consisting of asphaltum, gutta-percha, asbestos and sulfur in approximately the proportions specified.

3. The process of making a composition which consists in first melting asphaltum or the like; second, adding thereto, while hot, asbestos, and intimately mixing the two thoroughly together; third, spreading out the mass so mixed, on a hot surface, and thoroughly working, beating and pounding the same to drive out moisture and foreign substances;—the mass to be hot throughout the carrying out of the process; and fourth, forming the article desired of the mass, substantially as set forth.

In testimony of the foregoing specification I do hereby sign the same, in the city of New York, county and State of New York, this 23d day of November, A. D. 1896.

WILLIAM MORISON.

Witnesses:
J. ODELL FOWLER, Jr.,
ALFRED SOLENSON.